United States Patent
Huang et al.

(10) Patent No.: US 10,386,510 B2
(45) Date of Patent: Aug. 20, 2019

(54) EARTHQUAKE DETECTION SYSTEM AND METHOD

(71) Applicant: National Applied Research Laboratories, Taipei (TW)

(72) Inventors: Shieh-Kung Huang, Taoyuan (TW); Hung-Wei Chiang, Tainan (TW); Pei-Yang Lin, Taipei (TW); Ting-Yu Hsu, New Taipei (TW); Kung-Chun Lu, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 421 days.

(21) Appl. No.: 14/664,912

(22) Filed: Mar. 22, 2015

(65) Prior Publication Data

US 2015/0331121 A1 Nov. 19, 2015

(30) Foreign Application Priority Data

May 14, 2014 (TW) .............................. 103117026 A

(51) Int. Cl.
*G01V 1/00* (2006.01)
(52) U.S. Cl.
CPC .................... *G01V 1/008* (2013.01)
(58) Field of Classification Search
None
See application file for complete search history.

(56) References Cited

U.S. PATENT DOCUMENTS

| | | | |
|---|---|---|---|
| 7,280,920 B1 | 10/2007 | Whiteside | |
| 2011/0037588 A1 | 2/2011 | Zeng | |
| 2013/0046475 A1* | 2/2013 | Lin | G01V 1/008 |
| | | | 702/15 |

FOREIGN PATENT DOCUMENTS

| | | | | |
|---|---|---|---|---|
| CN | 103323873 A | 9/2013 | | |
| CN | 103336299 A | 10/2013 | | |
| EP | 2669814 A1 * | 12/2013 | ............ | G06F 17/30 |
| JP | 2006234480 A | 9/2006 | | |
| JP | 2009168509 | 7/2009 | | |
| JP | 2010203914 | 9/2010 | | |
| JP | 5102047 | 12/2012 | | |

OTHER PUBLICATIONS

Ma Qiang, "Study and Application on Earthquake Early Warning", Chinese Doctoral Dissertations Full-text Database, Basic Sciences, pp. 18-20, 26-27, A012-8, 2009, vol. 06, May 16, 2009.
Zhao, "Technology and Application for Battlefield Monitoring Ground Sensor System", Beijing Institute of Technology Press, Cover pages & p. 67, Mar. 31, 2011.

* cited by examiner

*Primary Examiner* — Robert K Carpenter
(74) *Attorney, Agent, or Firm* — Winston Hsu

(57) ABSTRACT

An earthquake detection system includes an earthquake data receiving module, for receiving a plurality of earthquake data and generating an earthquake parameter according to the plurality of earthquake data; a threshold value setting module, for setting an earthquake threshold according to the earthquake parameter; and an earthquake detector, for determining whether a new earthquake data belongs to an earthquake event according to the earthquake threshold when the new earthquake data is received, in order to generate a determination result; wherein the threshold value setting module further adjusts the earthquake threshold according to the determination result.

18 Claims, 3 Drawing Sheets

EARTHQUAKE DETECTION SYSTEM AND METHOD

BACKGROUND OF THE INVENTION

1. Field of the Invention

The present invention relates to an earthquake detection system and method, and more particularly, to an earthquake detection system and a related earthquake detection method capable of automatically adjusting earthquake detection parameters.

2. Description of the Prior Art

Due to advances in seismology, digital communication, automatic processing and algorithms, earthquake early warning (EEW) techniques have emerged in recent years. An earthquake warning system may realize the EEW according to characteristics of seismic waves. In general, the seismic waves can be separated into "P-waves", "S-waves" and "surface waves" in an increasing order of transmission speed. The surface waves have the maximum amplitude, and the S-waves are the next, where these two seismic waves are more destructive. The P-waves have smaller amplitude and faster speed. The earthquake warning system is capable of detecting the P-waves which arrive earlier via an earthquake detector before an earthquake occurs suddenly, in order to deliver a warning and adopt proper actions before severe damages occur.

However, the earthquake detector, as a sophisticated electronic instrument, is easily affected by small vibrations and/or noises in electronic signals. Therefore, the earthquake detector disposed in different locations may face noises of different types and having different magnitudes. For example, the earthquake detectors disposed in different regions may face different power supply statuses, where an earthquake detector in a factory may be supplied with commercial power, and an earthquake detector in or near a house or school may be supplied with household power. In addition, an earthquake detector near a factory may easily detect the vibrations generated by operations of machines in the factory, and an earthquake detector near a house or office building may easily be affected by people walking through or detect the vibrations generated by opening/closing a door or knocking a door.

Since the earthquake detectors disposed indifferent locations may face different environmental noises, the user of a conventional earthquake detector may input parameters to adjust the noise sensitivity of the earthquake detector according to the detector's location. However, with people's increasing needs of EEW, more various and complex earthquake warning systems should be established, which also increases the disposition density of the earthquake detectors. In such a situation, the parameters of each earthquake detector should be manually inputted by the user according to its location, and such operations are complex and inconvenient. In addition, even if different earthquake detectors may be located in the same location, these earthquake detectors may still face different environmental noises during different periods. Thus, there is a need to provide an earthquake detection system capable of automatically adjusting the parameters of the earthquake detector under different environmental noises.

SUMMARY OF THE INVENTION

It is therefore an objective of the present invention to provide an earthquake detection system and method, which are capable of automatically adjusting earthquake detection parameters according to earthquake detection results, in order to adapt to various environmental noises and achieve optimized earthquake determination.

The present invention discloses an earthquake detection system. The earthquake detection system comprises an earthquake data receiving module, for receiving a plurality of earthquake data and generating an earthquake parameter according to the plurality of earthquake data; a threshold value setting module, for setting an earthquake threshold according to the earthquake parameter; and an earthquake detector, for determining whether a new earthquake data belongs to an earthquake event according to the earthquake threshold when the new earthquake data is received, in order to generate a determination result. The threshold value setting module further adjusts the earthquake threshold according to the determination result.

The present invention further discloses an earthquake detection method. The earthquake detection method comprises receiving a plurality of earthquake data and generating an earthquake parameter according to the plurality of earthquake data; setting an earthquake threshold according to the earthquake parameter; determining whether a new earthquake data belongs to an earthquake event according to the earthquake threshold the new earthquake data is received, in order to generate a determination result; and adjusting the earthquake threshold according to the determination result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
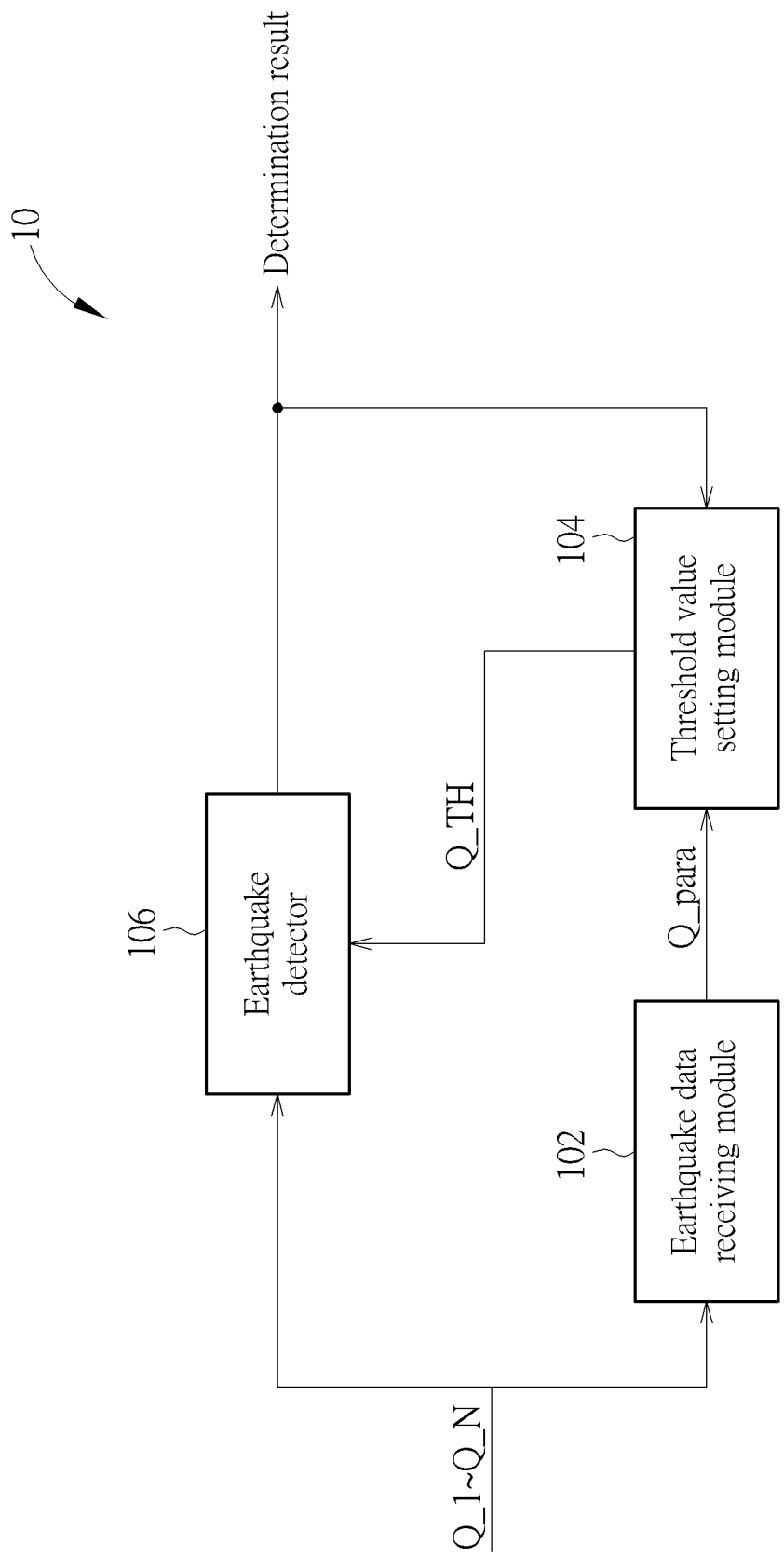
FIG. 1 is a schematic diagram of an earthquake detection system according to an embodiment of the present invention.

Please refer to FIG. 1, which is a schematic diagram of an earthquake detection system 10 according to an embodiment of the present invention. As shown in FIG. 1, the earthquake detection system 10 includes an earthquake data receiving module 102, a threshold value setting module 104 and an earthquake detector 106. The earthquake data receiving module 102 is utilized for receiving earthquake data $Q\_1$-$Q\_N$ and generating an earthquake parameter $Q\_para$ according to the earthquake data $Q\_1$-$Q\_N$. The threshold value setting module 104 may set an earthquake threshold $Q\_TH$ according to the earthquake parameter $Q\_para$. The earthquake detector 106 may determine whether a new earthquake data $Q\_new$ belongs to an earthquake event according to the earthquake threshold $Q\_TH$ when the new earthquake data $Q\_new$ is received, in order to generate a determination result. The threshold value setting module 104 then adjusts the earthquake threshold $Q\_TH$ according to the determination result. Therefore, each time when a new earthquake data arrives, the earthquake detector 106 may determine whether the new earthquake data belongs to an earthquake event according to the earthquake threshold Q_TH. The threshold value setting module 104 then adjusts the earthquake threshold Q_TH according to the determination result related to whether the new earthquake data belongs to an earthquake event. The above operations are repeated and the earthquake threshold Q_TH is updated accordingly.

In detail, the earthquake parameter Q_para generated by the earthquake data receiving module 102 according to the earthquake data Q_1-Q_N may include a characteristic function related to the earthquake data Q_1-Q_N. The threshold value setting module 104 then sets the earthquake threshold Q_TH according to statistical characteristics of the characteristic function, such as the maximum value, the minimum value or the average value of the characteristic function during a period of time. In an embodiment, the characteristic function may be described as follows:

$$\sum_{n=1}^{3} \sqrt{(d_{i,n} - d_{i-1,n})^2}$$

wherein $d_i$ and $d_{i-1}$ are accelerations of the $i^{th}$ and $(i-1)^{th}$ earthquake data among the earthquake data Q_1-Q_N, respectively, n=1-3 are three mutually perpendicular components of the accelerations in three-dimensional space.

Please note that the above function is only one of various embodiments of the characteristic function, which is not limited herein. For example, in the above function, the difference between each data and the previous one is applied to filter out noise interferences. In other embodiments, the parameters may also be adjusted by other methods to adapt to environmental statuses or noise issues. In addition, the acceleration is applied in the above function as the characteristic function, but in other embodiments, other physical parameters such as speed and displacement may also be incorporated in the characteristic function.

Figure 2:
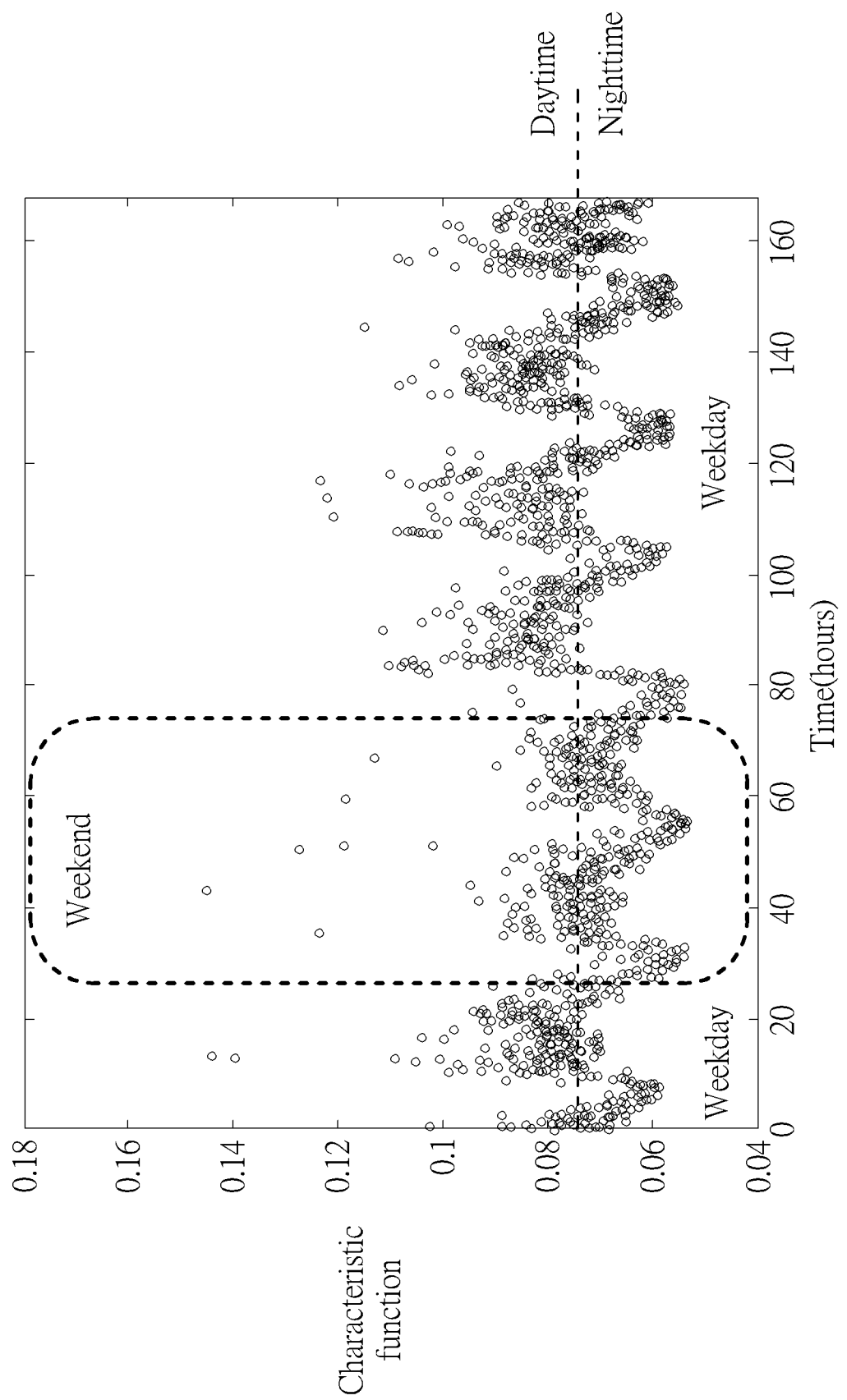
FIG. 2 is a schematic diagram of earthquake data detected by the earthquake detection system during a specific period of time.

In detail, the characteristic function may be utilized for reflecting the characteristics of the earthquake data Q_1-Q_N. The earthquake detection system located in different places may be under different environments, and therefore receive different earthquake data. For example, an earthquake detection system near an office building may detect more or stronger earthquake data during the commuting hours, but these earthquake data, which may be noises generated due to people opening/closing a door or walking through, are not earthquake events. Please refer to FIG. 2, which is a schematic diagram of earthquake data detected by the earthquake detection system 10 during a specific period of time. FIG. 2 illustrates a week (7 days) as an example, but this is not a limitation. As shown in FIG. 2, the characteristic function detected by the earthquake detection system 10 during a week has 7 peaks and valleys, where the peaks may stand for the data detected in the daytime and the valleys may stand for the data detected in the nighttime. Among the waveform, there are two consecutive peaks lower than other peaks, and these two lower peaks may stand for the data detected in the weekend while other five peaks may stand for the data detected in the weekday. The characteristic function has a positive correlation to environmental disturbances, and can thereby be utilized for determining the magnitude of vibrations. In FIG. 2, the value of the characteristic function detected in the daytime is substantially equal to 0.09-0.1, and the value of the characteristic function detected in the nighttime is substantially equal to 0.05-0.06.

The above value of the characteristic function is proportional to the magnitude of vibrations, and is thereby utilized for deducing the preferable earthquake threshold Q_TH. For example, according to the characteristic function shown in FIG. 2, the earthquake detection system 10 may detect the earthquake data with a magnitude substantially equal to 0.09-0.1 gal in the daytime, and detect the earthquake data with a magnitude substantially equal to 0.05-0.06 gal in the nighttime. If the earthquake threshold Q_TH is set to be slightly higher than 0.05-0.06 gal according to the earthquake data measured in the nighttime, frequent false triggering may occur in the daytime. If the earthquake threshold Q_TH is set to be slightly higher than 0.09-0.1 gal according to the earthquake data measured in the daytime, there may be more earthquake events unable to be detected.

Therefore, the threshold value setting module 104 may adjust the earthquake threshold Q_TH according to interferences of non-earthquake events (e.g., people walking, opening/closing a door or knocking a door) in different time, in order to prevent the vibrations generated by the non-earthquake events from interfering the earthquake detection functions of the earthquake detection system 10, which allows the earthquake detector 106 to perform an accurate earthquake determination. During a period of time when the non-earthquake events occur more often or generate larger vibrations as the condition in the daytime shown in FIG. 2, the threshold value setting module 104 may increase the earthquake threshold Q_TH. During a period of time when the non-earthquake events occur less often or generate smaller vibrations as the condition in the nighttime shown in FIG. 2, the threshold value setting module 104 may decrease the earthquake threshold Q_TH. By the above adjustment method, the threshold value setting module 104 may adjust the earthquake threshold Q_TH to be slightly higher than the magnitude of noises generated by the non-earthquake events in different time. Therefore, the earthquake detector 106 may perform accurate earthquake detection without being interfered by environmental noises.

In detail, the earthquake data receiving module 102 may perform a short-time average (STA) processing and a long-time average (LTA) processing on the earthquake data Q_1-Q_N during a period of time, in order to generate a STA value and a LTA value of the earthquake parameter Q_para, respectively. The threshold value setting module 104 may utilize the ratio of the STA value and the LTA value to adjust the earthquake threshold Q_TH. First, the threshold value setting module 104 may set a ratio of rising threshold and a ratio of falling threshold for determining the adjustment of the earthquake threshold Q_TH. For example, when the ratio of the STA value of the earthquake parameter Q_para to the LTA value of the earthquake parameter Q_para rises above the ratio of rising threshold, the threshold value setting module 104 may increase the earthquake threshold Q_TH. When the ratio of the STA value of the earthquake parameter Q_para to the LTA value of the earthquake parameter Q_para falls below the ratio of falling threshold, the threshold value setting module 104 may decrease the earthquake threshold Q_TH. The values of the ratio of rising threshold and the ratio of falling threshold may both be set according to user requirements, and are not limited herein.

In an embodiment, the earthquake detection system 10 may consider a lasting time for the STA value and the LTA value. After the STA value or the LTA value has an evident variation and maintains in the new value for more than a lasting time, this variation is considered as an effective variation. Since the earthquake detection system 10 is an electronic instrument with high sensitivity, it is easily interfered by electrical noises. When there is a spike in the power supply terminal, the earthquake detection system 10 may detect the instant spike signal, which influences the earthquake detection terminal. If a variation with an extremely short time appears in the STA value or the LTA value, this variation may be caused by the spike in the power supply terminal, and the lasting time may be set to filter out this interference.

Figure 3:
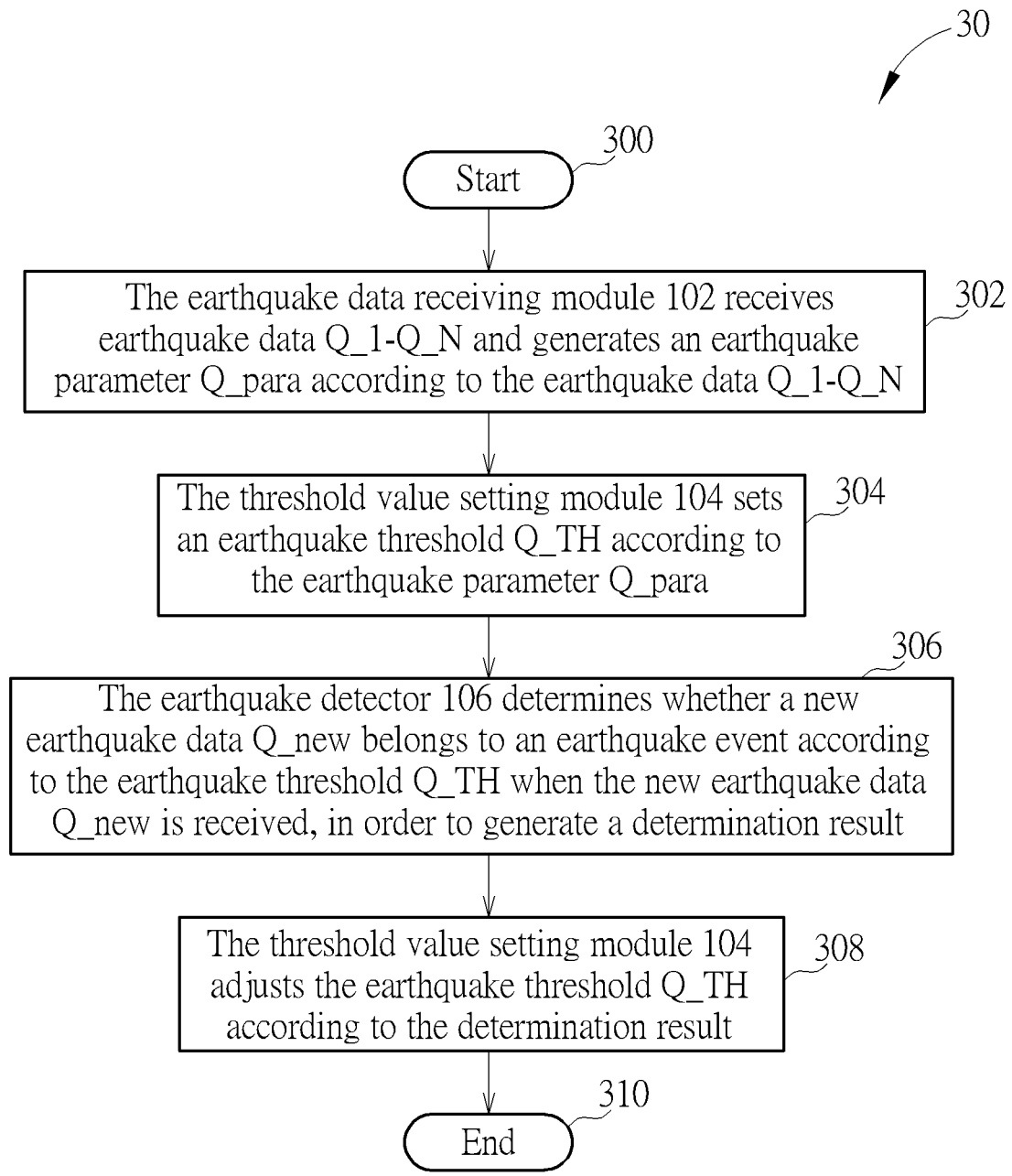
FIG. 3 is a schematic diagram of an earthquake detection process according to an embodiment of the present invention.

The abovementioned operations related to the earthquake detection system 10 may be summarized into an earthquake detection process 30, as shown in FIG. 3. The earthquake detection process 30 includes the following steps:

Step 300: Start.

Step 302: The earthquake data receiving module 102 receives earthquake data Q_1-Q_N and generates an earthquake parameter Q_para according to the earthquake data Q_1-Q_N.

Step 304: The threshold value setting module 104 sets an earthquake threshold Q_TH according to the earthquake parameter Q_para.

Step 306: The earthquake detector 106 determines whether a new earthquake data Q_new belongs to an earthquake event according to the earthquake threshold Q_TH when the new earthquake data Q_new is received, in order to generate a determination result.

Step 308: The threshold value setting module 104 adjusts the earthquake threshold Q_TH according to the determination result.

Step 310: End.

The detailed operations and alternations of the earthquake detection process 30 can be referred to the above description, and will not be narrated hereinafter.

In the prior art, the earthquake detectors disposed in different locations may face different environmental noises, and the user of a conventional earthquake detector may manually input parameters to adjust the noise sensitivity of the earthquake detector according to the detector's location. Therefore, the parameters of each earthquake detector should be manually inputted by the user according to its location, and such operations are complex and inconvenient. In comparison, the present invention provides an earthquake detection system and method capable of automatically adjusting earthquake detection parameters according to the earthquake detection results, in order to adapt to various environmental noises and further achieve the optimized earthquake determination result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An earthquake detection system, comprising:
   an earthquake data receiving module, for receiving a plurality of earthquake data and generating an earthquake parameter according to the plurality of earthquake data;
   a threshold value setting module, for setting an earthquake threshold according to the earthquake parameter; and
   an earthquake detector, for determining whether a new earthquake data belongs to an earthquake event by comparing the new earthquake data with the earthquake threshold at the time when the new earthquake data is received, in order to generate a determination result;
   wherein the threshold value setting module adjusts the earthquake threshold according to the determination result at the time when the determination result is generated; and
   wherein the earthquake threshold is adjusted to a first value in a first time period and adjusted to a second value in a second time period, wherein the first value is configured to be greater than the second value when a magnitude of environmental noises in the first time period is greater than a magnitude of environmental noises in the second time period.

2. The earthquake detection system of claim 1, wherein the earthquake parameter comprises a characteristic function related to the plurality of earthquake data.

3. The earthquake detection system of claim 2, wherein the threshold value setting module sets the earthquake threshold according to statistical characteristics of the characteristic function.

4. The earthquake detection system of claim 1, wherein the earthquake data receiving module performs a short-time average (STA) processing and a long-time average (LTA) processing on the plurality of earthquake data, in order to generate a STA value and a LTA value of the earthquake parameter.

5. The earthquake detection system of claim 4, wherein the threshold value setting module further utilizes a ratio of rising threshold and a ratio of falling threshold to determine an adjustment of the earthquake threshold according to the STA value and the LTA value of the earthquake parameter.

6. The earthquake detection system of claim 5, wherein the threshold value setting module increases the earthquake threshold when a ratio of the STA value to the LTA value rises above the ratio of rising threshold.

7. The earthquake detection system of claim 5, wherein the threshold value setting module decreases the earthquake threshold when a ratio of the STA value to the LTA value falls below the ratio of falling threshold.

8. The earthquake detection system of claim 4, wherein the threshold value setting module further adjusts the earthquake threshold according to a lasting time of the STA value and the LTA value.

9. The earthquake detection system of claim 1, wherein the threshold value setting module increases the earthquake threshold when a non-earthquake event has a higher occurrence frequency or generates a larger vibration, and decreases the earthquake threshold when the non-earthquake event has a lower occurrence frequency or generates a smaller vibration.

10. An earthquake detection method, comprising:
    receiving a plurality of earthquake data and generating an earthquake parameter according to the plurality of earthquake data;
    setting an earthquake threshold according to the earthquake parameter;
    determining whether a new earthquake data belongs to an earthquake event by comparing the new earthquake data with the earthquake threshold at the time when the new earthquake data is received, in order to generate a determination result; and
    adjusting the earthquake threshold according to the determination result at the time when the determination result is generated;
    wherein the earthquake threshold is adjusted to a first value in a first time period and adjusted to a second value in a second time period, wherein the first value is configured to be greater than the second value when a magnitude of environmental noises in the first time period is greater than a magnitude of environmental noises in the second time period.

11. The earthquake detection method of claim 10, wherein the earthquake parameter comprises a characteristic function related to the plurality of earthquake data.

12. The earthquake detection method of claim 11, wherein the step of setting the earthquake threshold according to the earthquake parameter comprises:
setting the earthquake threshold according to statistical characteristics of the characteristic function.

13. The earthquake detection method of claim 10, wherein the step of receiving the plurality of earthquake data and generating the earthquake parameter according to the plurality of earthquake data comprises:
performing a short-time average (STA) processing and a long-time average (LTA) processing on the plurality of earthquake data, in order to generate a STA value and a LTA value of the earthquake parameter.

14. The earthquake detection method of claim 13, further comprising:
utilizing a ratio of rising threshold and a ratio of falling threshold to determine an adjustment of the earthquake threshold according to the STA value and the LTA value of the earthquake parameter.

15. The earthquake detection method of claim 14, wherein the step of utilizing the ratio of rising threshold and the ratio of falling threshold to determine the adjustment of the earthquake threshold according to the STA value and the LTA value of the earthquake parameter comprises:
increasing the earthquake threshold when a ratio of the STA value to the LTA value rises above the ratio of rising threshold.

16. The earthquake detection method of claim 14, wherein the step of utilizing the ratio of rising threshold and the ratio of falling threshold to determine the adjustment of the earthquake threshold according to the STA value and the LTA value of the earthquake parameter comprises:
decreasing the earthquake threshold when a ratio of the STA value to the LTA value falls below the ratio of falling threshold.

17. The earthquake detection method of claim 13, further comprising:
adjusting the earthquake threshold according to a lasting time of the STA value and the LTA value.

18. The earthquake detection method of claim 10, further comprising:
increasing the earthquake threshold when a non-earthquake event has a higher occurrence frequency or generates a larger vibration; and
decreasing the earthquake threshold when the non-earthquake event has a lower occurrence frequency or generates a smaller vibration.

* * * * *